(12) United States Patent
Herges

(10) Patent No.: US 7,849,880 B2
(45) Date of Patent: Dec. 14, 2010

(54) ELECTROPNEUMATIC CENTRAL UNIT FOR A COMMERCIAL VEHICLE CONFIGURED OF MODULES WITH ELECTRICAL AND/OR PNEUMATIC COMPONENTS

(75) Inventor: Michael Herges, Korntal-Muenchingen (DE)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 904 days.

(21) Appl. No.: 11/790,070

(22) Filed: Apr. 23, 2007

(65) Prior Publication Data

US 2007/0270006 A1  Nov. 22, 2007

Related U.S. Application Data

(63) Continuation of application No. PCT/EP2005/011189, filed on Oct. 18, 2005.

(30) Foreign Application Priority Data

Oct. 21, 2004 (DE) .................. 10 2004 051 309

(51) Int. Cl.
*B60R 16/08* (2006.01)
*H05K 5/00* (2006.01)
*F15B 21/00* (2006.01)

(52) U.S. Cl. .................. 137/884; 137/271; 137/560

(58) Field of Classification Search ................ 137/269, 137/270, 271, 560, 884
See application file for complete search history.

(56) References Cited

U.S. PATENT DOCUMENTS

| 5,301,717 | A | * | 4/1994 | Goedecke | 137/884 |
| 5,348,047 | A | * | 9/1994 | Stoll et al. | 137/554 |
| 5,555,911 | A | * | 9/1996 | Fukano et al. | 137/625.69 |
| 5,617,898 | A | * | 4/1997 | Nagai et al. | 137/884 |
| 5,996,610 | A | * | 12/1999 | Sato et al. | 137/271 |
| 6,164,335 | A | * | 12/2000 | Hayashi et al. | 137/884 |
| 6,173,731 | B1 | * | 1/2001 | Ottliczky | 137/271 |
| 6,213,153 | B1 | * | 4/2001 | Hayashi et al. | 137/884 |
| 6,216,740 | B1 | | 4/2001 | Hayashi et al. | |
| 6,704,815 | B1 | * | 3/2004 | Morikawa et al. | 710/71 |
| 7,252,116 | B2 | * | 8/2007 | Miyazoe et al. | 137/625.64 |
| 2001/0003289 | A1 | * | 6/2001 | Mead et al. | 137/884 |
| 2002/0186666 | A1 | * | 12/2002 | Hassel et al. | 370/257 |
| 2004/0051381 | A1 | | 3/2004 | Garner et al. | |
| 2004/0145237 | A1 | | 7/2004 | Duchet et al. | |

FOREIGN PATENT DOCUMENTS

DE  33 27 005 A1  2/1984

(Continued)

OTHER PUBLICATIONS

International Search Report dated Jan. 10, 2006 w/English Translation (Two (2) pages).

*Primary Examiner*—John Rivell
(74) *Attorney, Agent, or Firm*—Crowell & Moring LLP

(57) ABSTRACT

An electropneumatic central unit for a commercial vehicle is made up of modules with electrical and/or pneumatic components. The individual modules are arranged in module housings detachably connected to each other in a defined position, on which standard pneumatic connectors and electrical connectors are arranged such that, on connection of the module housings, corresponding connectors, arranged on opposing connection surfaces of the module housings, form direct mutual electrical and pneumatic connections.

18 Claims, 2 Drawing Sheets

FOREIGN PATENT DOCUMENTS

| | | |
|---|---|---|
| DE | 3514989 A1 | 10/1986 |
| DE | 199 07 667 C1 | 9/2000 |
| EP | 0 976 636 A2 | 2/2000 |
| EP | 1 081 389 A2 | 3/2001 |
| EP | 1 400 702 A2 | 3/2004 |
| GB | 2 125 903 A | 3/1984 |
| WO | WO 03/008249 A2 | 1/2003 |
| WO | WO 03/008250 A2 | 1/2003 |

\* cited by examiner

FIG..1

ELECTROPNEUMATIC CENTRAL UNIT FOR A COMMERCIAL VEHICLE CONFIGURED OF MODULES WITH ELECTRICAL AND/OR PNEUMATIC COMPONENTS

CROSS-REFERENCE TO RELATED APPLICATIONS

This application is a continuation of PCT International Application No. PCT/EP2005/011189, filed on Oct. 18, 2005, which claims priority under 35 U.S.C. §119 to German Application No. 10 2004 051 309.0, filed Oct. 21, 2004, the entire disclosures of which are expressly incorporated by reference herein.

BACKGROUND AND SUMMARY OF THE INVENTION

The invention relates to an electropneumatic central unit for a commercial vehicle made up of modules with electrical and/or pneumatic components, wherein the individual modules are accommodated in module housings which are releasably connected to one another in a defined position and on which standardized pneumatic and electrical connections are arranged such that, when the module housings are connected, connections which are associated with one another and are arranged on opposing connection faces of the module housings form direct electrical and pneumatic connections with one another.

Nowadays, the pneumatic equipment in a modern commercial vehicle includes a plurality of electrical and/or pneumatic components, which are supplied with compressed air and also have electronic control systems. Most of these components are in the form of individual devices which can form different levels and combinations of equipment features when connected to one another. However, in this case, pneumatic lines and fittings of each device have to be individually supplied with compressed air. Furthermore, many devices of this type have their own electronic controllers and are each supplied with power and electrical signals via their own electrical lines. Furthermore, each of the controllers has to be individually equipped with circuits for voltage supply, for overvoltage protection, polarity-reversal protection, ESD protection, CAN interfaces, etc., and also has at least one microprocessor with a watchdog.

In addition to this, a plurality of electropneumatic components are also integrated in a common housing, with the result that only one controller and one pneumatic and electrical power supply are required. However, this procedure has the disadvantage that the number of variations grows depending on the level of equipment features. At the same time, repair costs are increased if the entire device has to be replaced in the event of a fault in one of the integrated systems.

DE 33 27 005 A1 describes a hydraulic distributor, which includes a plurality of individual blocks connected to one another. Each of these blocks has connection openings for a pressure line and a return line to the liquid reservoir. The connection openings, which are to be connected to one another, of adjacent individual blocks are arranged at suitable locations.

DE 199 07 667 C1 discloses a central unit in which various electropneumatic devices, for example an air dryer, a trailer control valve, a redundancy valve etc., are arranged separately from one another on a mounting plate, with the result that pneumatic and electrical lines running between the individual devices each have to be individually laid. In contrast, a connector strip, which is likewise fixed there, serves merely to receive pneumatic lines.

In the air-treatment apparatus according to US 2004/0145237 A1, a series of modules are connected to a controller by way of an intermediate piece, which serves exclusively to conduct electrical and pneumatic signals from the modules to the controller. A breakdown of this intermediate piece necessarily results in a breakdown of the entire system.

EP 1 400 702 A2 describes a pneumatic arrangement in which a plurality of maintenance modules, which are arranged next to one another, are connected to a control module via a common separate bus system. In this case, the bus system includes a plurality of bus modules associated with a respective maintenance and in the form of strip elements here. The bus system serves merely for the data interchange of electrical signals.

EP 1 081 389 A2 describes an electropneumatic device with electromagnetic valves which are arranged next to one another by way of separate branch blocks which are flange-connected to one another and pass on only pneumatic and electrical signals, but do not functionally influence or change the signals.

Accordingly, the above-mentioned prior art contains assemblies and modules which are formed separately from the actual functional modules and serve exclusively to divert or conduct electrical and pneumatic signals. However, this procedure requires a relatively high number of electrical and pneumatic connections, which are to be connected to one another, when the modules are joined. This has a disadvantageous effect on the frequency with which faults occur. In addition, a breakdown of an assembly which serves exclusively to pass on electrical and/or pneumatic signals results in a breakdown of the entire system.

In contrast, the object of the present invention is to form a central unit which is provided for a commercial vehicle in such a way that it has greater availability.

According to the invention, this object is achieved by an electropneumatic central unit for a commercial vehicle, which is made up of modules with electrical and/or pneumatic components, wherein the individual modules are accommodated in module housings releasably connected to one another in a defined position and on which standardized pneumatic connections and electrical connections are arranged such that, when the module housings are connected, connections which are associated with one another and are arranged on opposing connection faces of the module housings form direct electrical and pneumatic connections with one another. The central unit is constructed without modules which serve merely to conduct pneumatic and/or electrical signals between modules.

The present invention is advantageous in that no further additional connection lines are necessary since the electrical and pneumatic connections are automatically produced by the connection of the individual modules, for example by plug and/or contact connections, which engage with one another when the module housings are joined to one another. This results in extremely favorable production and manufacture of such a central unit.

In the present invention, continuous pneumatic channels, for example pneumatic supply channels, may be formed, which channels only need to be connected to a central compressed-air source from one side or in the case of which an air-conditioning unit itself represents an integrated module of the central unit and/or connected-through electrical lines. Since the connections are located directly on the connection faces between the module housings, which are firmly connected to one another during operation, very economical solutions are possible. Furthermore, modules of this type having standardized electrical and pneumatic connections may be used to produce a large variety of variants of electropneumatic central units. Last but not least, a central unit of this type can be repaired in a very cost-effective manner since only the defective module has to be replaced in each case. In this way, a compact central unit is created, which can be treated like an individual module.

In order for the electrical and pneumatic connections to be made, the module housings have to be connected to one another in a defined position, the electrical and pneumatic connections which are associated with one another have to be standardized, that is to say have the same connection dimensions in relation to the respective form of energy—electrical or pneumatic—and, in the installation position, be aligned with one another or make contact with one another such that they are aligned. Similarly, the connection faces of the modules have to be designed such that the modules can be fixed to one another in any desired combination and preferably also in any desired order and at the same time produce conductive electrical connections or pressure-tight pneumatic connections.

The invention proposes constructing the central unit without modules serving merely to conduct pneumatic and/or electrical signals between other modules.

Modules which serve merely to pass on electrical and/or pneumatic signals are to be understood, for example, as modules such as the separate intermediate piece according to US 2004/0145237 A1, the common separate bus system according to EP 1 400 702 A2, or the branch blocks which are flange-connected to one another according to EP 1 081 389 A2. Avoiding such modules reduces the possibility of the entire system breaking down in the event of such a module breaking down, and this has a positive effect on the availability of the central unit. A further result is a central unit in which signal-conducting functions are implemented by the functional modules themselves, with the result that the omission of purely conductive modules is accompanied by savings in electrical and pneumatic contact points between the functional modules. This likewise reduces the frequency with which faults occur.

A person skilled in the art will be aware of several embodiments which meet these requirements and of which some are described in the subclaims.

In order to connect at least two modules to one module, the module housings of at least some modules particularly preferably have pneumatic and electrical connections on at least two different connection faces. If at least the connection faces of the module housings are furthermore of planar design, the central unit can be constructed from a plurality of modules which are fixed to one another in series, with a termination plate then being provided for the pneumatic and electrical connections of a connection face of a first module and/or of a last module. The termination plate closes the pneumatic connections.

In this case, the electrical connections include, for example, contact areas which are arranged on the connection faces of the module housings and/or male/female connector strips which can be plugged into one another. Power supply lines, signal lines and/or data buses, which extend at least through a portion of the central unit, are formed by the electrical connections of the individual modules.

The pneumatic connections are preferably likewise arranged on the connection faces of the module housings, with the pneumatic connections being formed, for example, by pneumatic connections being contact-connected in a sealed manner and/or being plugged into one another.

The module may be connected to one another by tie rods and may have centering areas.

At least one module may be formed by an air-conditioning unit which includes an electronic controller implementing the function logic of at least some of the other modules and actuating them via the electrical connections. In addition, at least one module can include only one central controller and only connect-through pneumatic signals Furthermore, at least some of the modules may have, in addition to the connections for forming electrical and pneumatic connections with one another, additional electrical and/ or pneumatic connections for external signals.

A continuous pneumatic channel, for example a ventilation channel, is then formed by a connection of at least some modules, to which channel an external, common sound absorber can be connected.

The construction of a central unit from a plurality of modules with electrical and/or pneumatic components is explained by the following description of one exemplary embodiment of the invention.

DETAILED DESCRIPTION OF THE DRAWING

Figure 1:
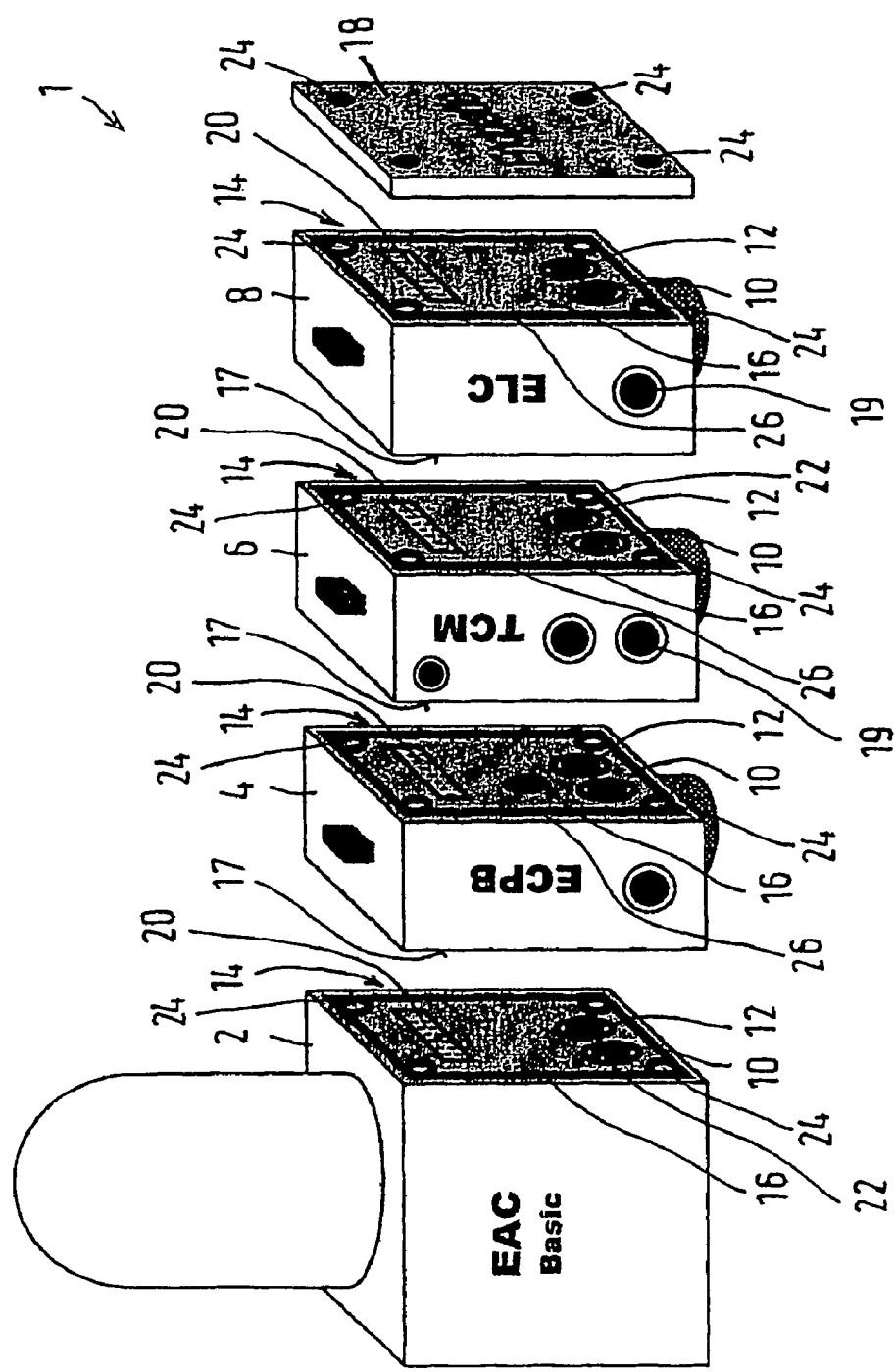
FIG. 1 shows an exploded perspective illustration of a central unit of a commercial vehicle made up of modules which are connected to one another and have electrical and/or pneumatic components, according to one preferred embodiment.

The electropneumatic central unit of a commercial vehicle, which central unit, as a whole, is designated 1 in FIG. 1, is constructed from individual modules which are manufactured separately from one another and have electrical and/or pneumatic components, for example from a EAC (Electronic Air Control) module, and ECPB (Electronic Controlled Parking Brake) module, a TCM (Trailer Control) module, and an ELC (Electronic Level Control) module.

These modules each contain the actuators which are required in order for them to function, for example solenoid valves, possibly the associated actuating circuits (output stages, free-wheeling diodes etc.), sensors, for example pressure sensors, and also possibly a simple low-cost microprocessor for controlling the output stages, reading the sensors and operator control elements and for communication with the central controller. An ESD protection means may also be provided in order to avoid damage during service. The circuits for 5V voltage supply, overvoltage protection, polarity-reversal protection, CAN interface etc. are provided only once in the central controller.

The EAC module is an electronically controlled unit for air-conditioning. It contains a pressure limiter, a multi-circuit protection valve, an air dryer, and an electronic controller which, in this case, can also be used to implement the function logic of the other modules integrated in the central unit 1. The module controls, for example, the reservoir pressures of the brake circuits and further pneumatic circuits. It also contains electrical connectors 20 for the power supply and for a vehicle bus (for example a CAN J1939) and possibly further electrical connections.

The ECPB module is a unit for controlling the pressures in the spring brake cylinders by way of valves, which can be electrically actuated. It usually includes a controller whose function is, in this case, taken over by the controller of the EAC module or an ECU module which is explained further below. The ECPB module contains connectors 20 for the connection of further ECPB components such as a parking brake operator control device and possibly further valve blocks.

The TCM module is a component of an electronic brake system (EBS), which serves to control the trailer. It normally includes a controller whose function is, in this case, taken over by the controller of the EAC module or of the ECU module which is explained further below. The TCM module contains connectors 20 for connection to the controller of the electronic brake system (EBS), pneumatic input 10, 12 for connection to the EBS backup pressure and for connection to the parking brake (ECPB module). Furthermore, pneumatic outputs to the trailer are provided.

The ELC module is a unit which controls an electronic suspension arrangement. It contains valves, which can be electrically actuated, for controlling the bellows pressure of the suspension arrangement and normally a controller whose function is however, in this case, taken over by the controller of the EAC module or of the ECU module. The ELC module may contain connectors for the connection of further ELC components, for example further valve blocks or a remote control arrangement and also pneumatic outputs 10, 12.

Figure 2:
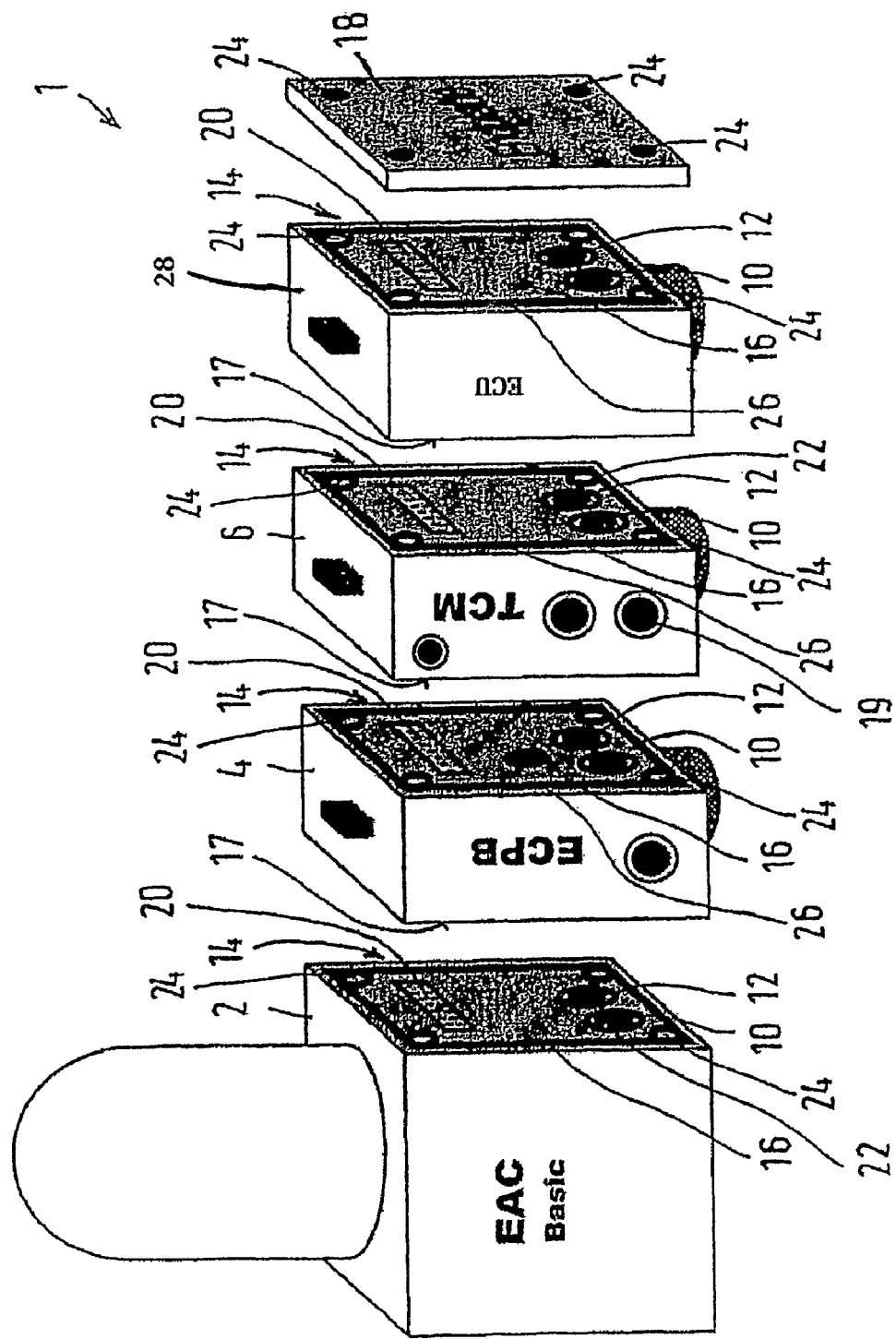
FIG. 2 is an embodiment similar to the embodiment of FIG. 1, with a module having a central computer.

An ECU (Electronic Control Unit) module 28, as shown in FIG. 2, could also be provided in place of the ELC module. The ECU module takes over the controller function of the central unit 1 if no EAC module is provided. It may possibly contain pneumatic inputs for conventional external cabling. It also contains connectors for the power supply and a vehicle bus (for example a CAN J1939) and possibly further electrical connections.

The above list is not exclusive as it includes modules as are used according to a preferred embodiment of the invention. As an alternative, fewer or more modules, and also any desired other pneumatically and/or electrically acting modules, are feasible, these modules being integrated in the central unit 1.

The modules are accommodated in module housings 2, 4, 6, 8, which are releasably connected to one another in a defined position and on which standardized pneumatic connections 10, 12 and electrical connections 14 are arranged such that, when the module housings 2, 4, 6, 8 are connected, connections 10, 12, 14 which are associated with one another and are arranged on opposing connection faces 16, 17 of the module housings 2, 4, 6, 8 form direct electrical and pneumatic connections with one another.

The modules are particularly preferably designed as rectangular blocks and have pneumatic and electrical connections 10, 12, 14 for the purpose of connecting two modules to one module on two preferably planar connection faces 16, 17 which face away from one another.

The central unit 1 may then be constructed from a plurality of modules which are block-connected to one another in series, with a termination plate 18 being provided for the pneumatic and electrical connections 10, 12, 14 of a connection face 16 of the last module (here, the ELC module). The termination plate closes at least the pneumatic connections 10, 12 or provides connections for external pneumatic and/or electrical signals. Since compressed air is supplied via the first module (here, the EAC module), in the present case, the termination plate 18 serves merely as a closure here.

The pneumatic connections 10, 12 may be reservoir connections for supplying the relevant module with reservoir pressure and/or be signal connections via which pneumatic control signals are fed to the relevant module. If, on account of its function, a module does not require either reservoir pressure or pneumatic control signals, the compressed air is merely conducted through a pneumatic channel, which is provided in the module, to the neighboring module. This may be the case in a pure ECU module which only "connects-through" the pneumatic pressure.

In this case, the electrical connections 14 include contact areas which are arranged on the planar connection faces 16 of the module housings 2, 4, 6, 8 and/or male and female connector strips (20) which can be plugged into one another, with power supply lines, signal lines and/or data buses which extend at least through a portion of the central unit 1 being formed by the electrical connections of the individual modules.

The pneumatic connections 10, 12 are preferably likewise arranged on the planar connection faces 16, 17 of the module housings 2, 4, 6, 8, with the pneumatic connections being formed, for example, by pneumatic connections 10, 12 being contact-connected in a sealed manner and/or being plugged into one another, and a seal being produced by corresponding, preferably elastic, seals 22 on the circumference of the openings of the pneumatic connections 10, 12. Pneumatic outputs of the modules are led out on side faces, which are not connected to other modules, via connections 19 for example. In general, at least some of the modules may also have, in addition to the connections 10, 12, 14 for forming electrical and pneumatic connections with one another, additional electrical and/or pneumatic connections for external signals. The module housings 2, 4, 6, 8 can also have additional electrical connections, for example for reading specific operator control units or for controlling devices or modules not contained in the central unit 1.

The module housings 2, 4, 6, 8 are connected to one another, for example, by tie rods (not illustrated here) which protrude through through-holes 24 which are arranged at the corners of the module housings 2, 4, 6, 8. In addition, the module housings 2, 4, 6, 8 can have centering areas by which they can be oriented with respect to one another in order to ensure alignment of the pneumatic and electrical connections 10, 12, 14 and the through-holes 24 for the tie rods. In order to provide additional sealing, circumferential seals 26 may be provided on the outer circumference of the connection faces 16, 17 of the module housings 2, 4, 6, 8.

In the case of modules which pneumatically interact with other modules, further direct connections are also possible via holes at defined locations of the connection faces 16, 17 of the modules. However, this requires these modules to be in a defined order in the arrangement. In order to avoid undefined malfunctions on account of the modules being in the incorrect order in the central unit 1, two different pneumatic signals must not be provided at the same position of the connection face 16, 17.

A continuous pneumatic channel, for example a ventilation channel, is then formed by a connection of at least some modules, to which channel an external, common sound absorber can be connected.

| Table of Reference Numbers | |
|---|---|
| 1 | Central unit |
| 2 | Module housing |
| 4 | Module housing |
| 8 | Module housing |
| 10 | Pneumatic connections |

-continued

Table of Reference Numbers

| | |
|---|---|
| 12 | Pneumatic connections |
| 14 | Electrical connections |
| 16 | Connection faces |
| 17 | Connection faces |
| 18 | Termination plate |
| 19 | Pneumatic connection |
| 20 | Female/male connector strip |
| 22 | Seals |
| 24 | Through-holes |
| 26 | Seals |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electropneumatic central unit for a commercial vehicle, comprising:
   a plurality of individual modules having at least one of electrical and pneumatic components, said individual modules being accommodated in respective module housings releasably coupled to one another in a defined position, wherein each of the module housings have standardized pneumatic connections and electrical connections arranged such that, when the module housings are coupled together, connections associated with one another and arranged on opposing connection faces of the module housings form direct electrical and pneumatic connections with one another; and
   wherein none of the plurality of modules serve merely to conduct at least one of the pneumatic and electrical signals between the modules, and
   wherein at least one module comprises a central controller and only connects-through pneumatic signals.

2. The electropneumatic central unit as claimed in claim 1, wherein in order to connect at least two modules to one module, the module housings of at least some modules have pneumatic and electrical connections on at least two different connection faces.

3. The electropneumatic central unit as claimed in claim 2, wherein at least the connection faces of the module housings are of planar design.

4. The electropneumatic central unit as claimed in claim 1, wherein the electrical connections comprise at least one of: (a) contact areas arranged on the connection faces of the module housings, and (b) male/female connector strips pluggable into one another.

5. The electropneumatic central unit as claimed in claim 4, wherein power supply lines, signal lines and/or data buses which extend at least through a portion of the central unit are formed by the electrical connections of the individual modules.

6. The electropneumatic central unit as claimed in claim 1, wherein the pneumatic connections are arranged on the connection faces of the module housings and the pneumatic connections are formed by pneumatic connections being contact-connected in a sealed manner and/or being plugged into one another.

7. The electropneumatic central unit as claimed in claim 4, wherein the pneumatic connections are arranged on the connection faces of the module housings and the pneumatic connections are formed by pneumatic connections being contact-connected in a sealed manner and/or being plugged into one another.

8. The electropneumatic central unit as claimed in claim 1, wherein the plurality of modules are fixed to one another in series, with a termination plate being provided for the pneumatic and electrical connections of a connection face of a first module and/or of a last module, said termination plate closing at least the pneumatic connections or providing connections for external pneumatic and/or electrical signals.

9. The electropneumatic central unit as claimed in claim 8, wherein the module housings are connected to one another by tie rods and have centering areas.

10. The electropneumatic central unit as claimed in claim 1, wherein at least one module is formed by an air-conditioning module which comprises an electronic controller which implements a function logic of at least some of the other modules and actuates at least some of the other modules via the electrical connections.

11. The electropneumatic central unit as claimed in claim 1, wherein at least some of the modules have, in addition to the connections for forming electrical and pneumatic connections with one another, additional electrical and/or pneumatic connections.

12. The electropneumatic central unit as claimed in claim 1, wherein a continuous pneumatic channel is formed by a connection of at least some of the modules, to which channel an external, common sound absorber is connected.

13. An electropneumatic central unit for a commercial vehicle, comprising:
   a plurality of functional modules, each including at least one of electrical and pneumatic components and none of which serve merely to conduct at least one of pneumatic and electrical signals between functional modules;
   a plurality of module housings, each module housing containing one of the plurality of functional modules, each module housing being operatively configured for releasably connecting to another module housing in a defined position;
   wherein each module housing is further operatively configured with standardized pneumatic connections and electrical connections arranged in a predefined location such that, when coupled with an adjoining module housing, the pneumatic connections and electrical connections of each module housing are directly connected with one another, and
   wherein at least one module comprises a central controller and only connects-through pneumatic signals.

14. The electropneumatic central unit as claimed in claim 13, wherein each module housing has a substantially rectangular shape, opposing faces forming connection faces for the functional module.

15. The electropneumatic central unit as claimed in claim 14, wherein the electrical connections comprise at least one of (a) contact areas arranged on the connection faces of the module housings, and (b) male/female connector strips pluggable into an adjacent counterpart connector strip.

16. The electropneumatic central unit as claimed in claim 14, further comprising a termination plate arranged at one end of the plurality of functional modules when coupled together, the termination plate at least one of closing at least the pneumatic connections and connecting external pneumatic and/or electrical signals.

17. The electropneumatic central unit as claimed in claim 14, further comprising tie rods extending through the connection faces of the plurality of modules to secure the plurality of modules together.

18. The electropneumatic central unit as claimed in claim 17, further comprising a sound absorber commonly coupled to the plurality of modules via a continuous pneumatic channel formed through the plurality of modules.

* * * * *